No. 736,360. PATENTED AUG. 18, 1903.
N. BURGESS.
APPARATUS FOR EXERCISING HORSES OR OTHER ANIMALS ON SHIPBOARD OR OTHER PLACES.
APPLICATION FILED MAR. 16, 1899.
NO MODEL. 2 SHEETS—SHEET 1.

Witnesses: Inventor:
Emma P. Coffin Neilson Burgess
William H. Barklee by Chas. L. Burdett
 Attorney Breaking & training devices.
No. 736,360. PATENTED AUG. 18, 1903.
N. BURGESS.
APPARATUS FOR EXERCISING HORSES OR OTHER ANIMALS ON SHIPBOARD OR OTHER PLACES.
APPLICATION FILED MAR. 16, 1899.
NO MODEL. 2 SHEETS—SHEET 2.
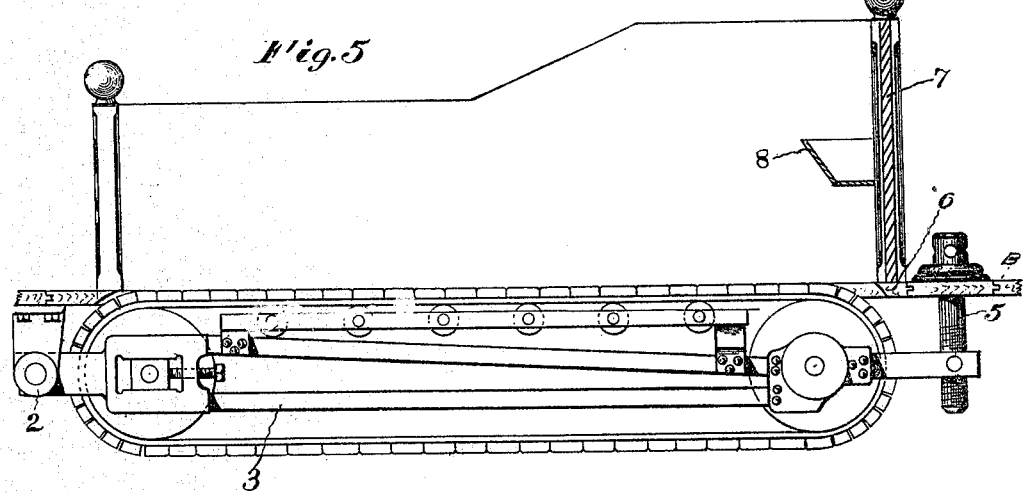
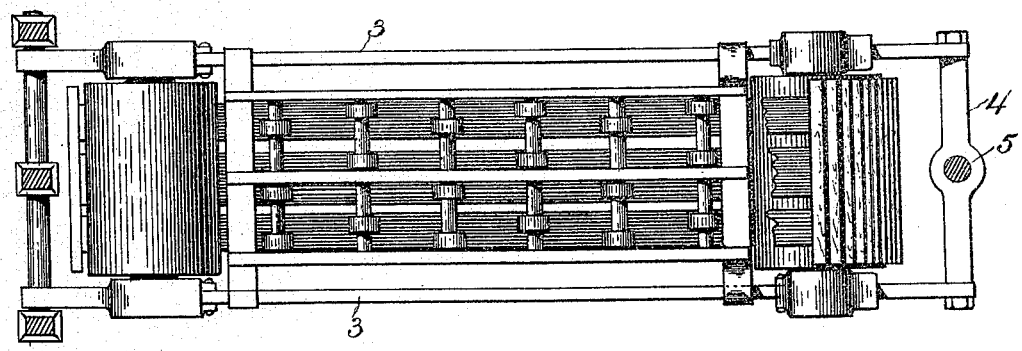
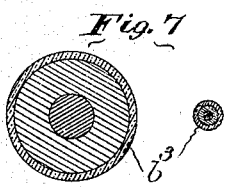

No. 736,360. Patented August 18, 1903.

UNITED STATES PATENT OFFICE.

NEILSON BURGESS, OF HIGHLANDS, NEW JERSEY, ASSIGNOR TO ANN STODDART, OF HIGHLANDS, NEW JERSEY.

APPARATUS FOR EXERCISING HORSES OR OTHER ANIMALS ON SHIPBOARD OR OTHER PLACES.

SPECIFICATION forming part of Letters Patent No. 736,360, dated August 18, 1903.

Application filed March 16, 1899. Serial No. 709,317. (No model.)

*To all whom it may concern:*

Be it known that I, NEILSON BURGESS, a citizen of the United States, and a resident of Highlands, in the county of Monmouth and State of New Jersey, have invented certain new and useful Improvements in Apparatus for Exercising Horses or other Animals on Shipboard or Like Purposes, of which the following is a full, clear, and exact description, whereby any one skilled in the art can make and use the same.

My invention relates to an apparatus for exercising horses and other animals on shipboard or for like purposes; and the object of my invention is to provide a device of this kind whereby a horse may regularly be put through the operations of running, galloping, or the like in a space of comparatively small area.

To this end my invention consists in the device as a whole, in the combination of parts, and in the details and their combination, as hereinafter described, and more particularly pointed out in the claims.

Figure 1:
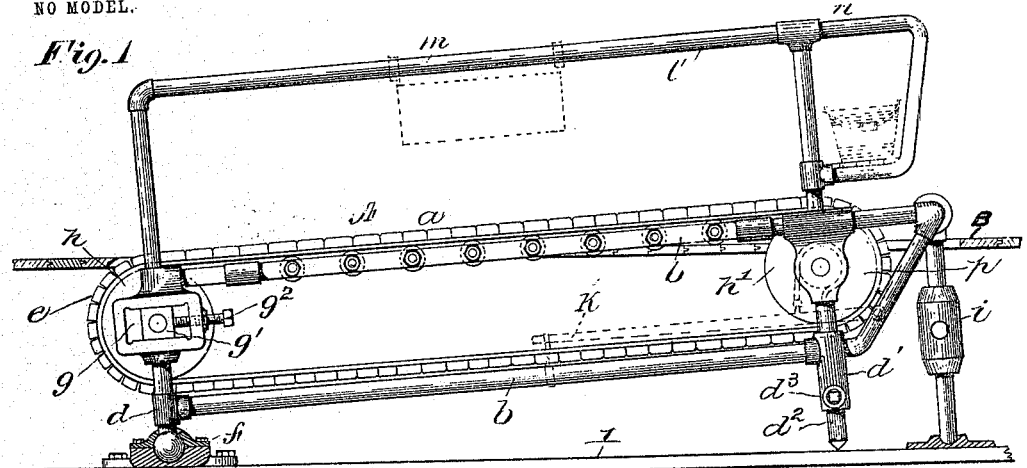
Figure 2:
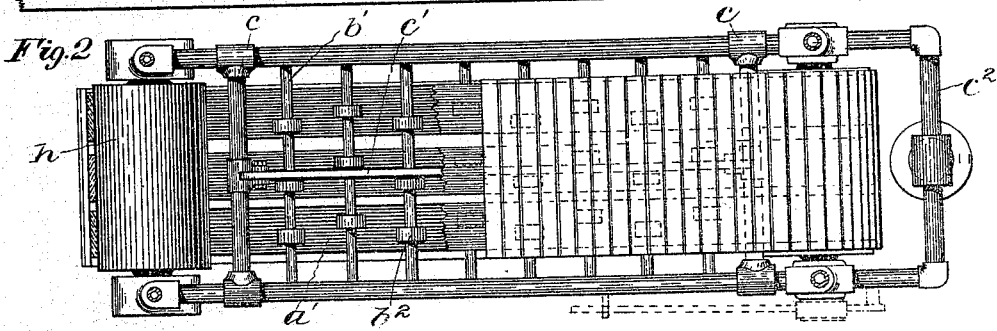
Figure 4:
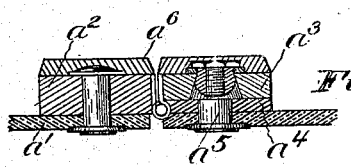
Figure 3:
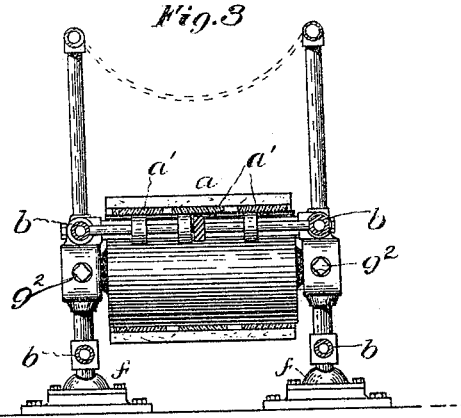

Referring to the drawings, Figure 1 is a detail side view of an apparatus embodying my invention with parts cut in section. Fig. 2 is a top or plan view of the same with parts broken away to show construction. Fig. 3 is a view in vertical cross-section through the device. Fig. 4 is a detail view showing a method of uniting the ends of the traveling platform. Fig. 5 is a side view showing a modified form of apparatus. Fig. 6 is a plan view of this latter form. Fig. 7 is a detail view in cross-section through a drum and a roller.

In the accompanying drawings, the numeral 1 denotes a floor or like support, as the deck of a vessel, on which the device as a whole is supported. A frame composed of side parts $b$, cross members $c$, and uprights $d$ $d'$ is constructed, preferably, of tubing firmly united at the corners, and on this frame is mounted a traveling platform $e$. The uprights $d$ have formed at their lower end a ball-and-socket joint $f$, the socket-piece of which is supported on or secured to the floor, this construction providing means whereby the frame as a whole may be tilted for a purpose to be hereinafter described.

Each of the uprights $d$ is provided with a guideway $g$, within each of which a bearing-block $g'$ is adjustably formed and each of which may be adjusted, as by means of an adjusting-screw $g^2$. A roller or drum $h$ has its bearings formed in these bearing-blocks, and a roller or drum $h'$ is mounted in bearings in each of the uprights $d'$. A movable platform extends around these drums, this platform consisting of an endless band formed of flat transverse slats $a$, connected as by means of belts or bands $a'$. In the form of device shown three of these belts of comparatively thick material are employed to which the slats are riveted or otherwise secured. The ends of the belts $a'$ are not directly joined, but, as shown in Fig. 4 of the drawings, the slat $a^2$, to which one extremity of each of the belts is riveted, is hinged to the next slat $a^3$, which is slightly thinner than the other slats and is not riveted to the belts. The other extremities of said belts are secured to a strip or sheet of metal $a^4$, as by rivets $a^5$, having conical stems. This metal strip $a^4$ is of the same width as the slats $a$ and of a thickness equal to the reduction in thickness of the slat $a^3$, so that this strip fits under the same flush with the adjacent slats. The slat $a^3$ is provided with holes into which the conical stems of the rivets $a^5$ fit, and the parts are held together, as by means of studs screwed into the rivets, as shown. An effective joint is thus provided for the ends of the platform and one which permits of the ends being readily disconnected, so that the platform may be removed and rolled up for packing or storage.

The upper surface of each of the slats $a$ is covered with a strip $a^6$ of suitable material to form a tread-surface, the said material also serving to cover or protect the heads of the hereinbefore-mentioned rivets and studs.

The upper portion of the platform A upon which the horse treads is supported upon bearings consisting of rollers $b^2$, supported on rods $b'$, secured to the side parts $b$ of the frame. These rods may also be supported in a bearing-piece $c'$, secured at each end to the cross-pieces $c$. These rollers are arranged under each strip in what may be termed "double" rows and so as to alternate or break joints with one another, and thus provide a more continuous bearing-surface for the platform. It is obvious, however, that the rollers may be variously arranged and yet come within the scope of the invention.

The upper side parts $b$ are extended beyond the uprights $d'$, as shown in Figs. 1 and 2 of the drawings, and to the cross-piece $c^2$ is connected a lifting-screw or like device $i$. This lifting-screw is suitably seated on the floor or support 1, and by means of its rotation this end of the platform is raised or depressed, as may be desired. Each of the uprights $d'$ is provided with an extension $d^2$, that may be adjustably secured to the upright, as by means of set-screws $d^3$, these extensions serving to support the weight of the device when it has been elevated to the proper position and to remove all strain from the adjusting-screw $i$.

A brake device $k$ of any suitable construction may be operatively connected with the drum $h'$ for retarding the movement of the traveling platform, as shown in dotted outline in Figs. 1 and 2 of the drawings.

A stall is formed on the upper part of the device and consists of side parts $l'$, preferably formed of tubing. The traveling platform A in fact forms the floor for the stall, the platform being held against movement when the device is used simply as a stall and being tilted to cause it to move when it is desired to use the device as an exerciser. It is obvious that the horse may be fastened by traces to a fixed support and move the platform as in walking while it is in a horizontal position and that on tightening the belt or by employing the brake device any required amount of force will be employed to move the platform, such amount depending on whether an ordinary draft-horse is to be exercised or whether the horse is to be exercised merely for running or racing purposes.

A support $m$ extends between the upper side parts of the frame $l'$ and is used to support a horse on the platform, the device being found advantageous for a horse to which the apparatus is new or for supporting a horse on a vessel that may be rolling in a heavy sea and thus prevent the animal from being thrown.

A manger $n$ is formed as part of the frame or stall, in which the food and drink for the horse may be placed. Any suitable means may be connected up to the platform, if desired, for indicating the rate at which the horse may be traveling.

While the device as shown in Figs. 1 and a is not shown in position with relation to the deck of a vessel or like floor, it is to be understood that when its traveling floor is in its normal or horizontal position it will lie just even with such floor, the support $a$ being located below the floor proper.

In the form of device shown in Figs. 5 and 6 the apparatus is arranged to be supported below the level of the deck of a vessel much the same as in the case of the device illustrated in Figs. 1 and 2, above described, the special features of construction being the same in both instances and the difference residing mainly in the construction of the main parts. In this latter form a hanger 2 is secured underneath the floor in which the side parts 3 of the frame are supported at one end, the opposite end of the frame being supported by means of a cross-piece 4, connected with the adjusting-screw 5. The traveling platform in this instance is mounted on rollers in the side parts 3 of the frame in the same manner as described with reference to the other form of the device. The flooring 6 in this form of the device is brought up on the sides to a point close to the traveling platform, the main parts of the device being located underneath the flooring. In this latter form of device the side parts 7 form the stall, which is secured to the floor in the ordinary manner, a manger 8 being employed for the usual purposes.

A supplemental floor B may be arranged on a level with the platform in the form of device shown in Figs. 1 and 2 of the drawings, if desired and as illustrated in Fig. 5.

In Fig. 7 of the drawings there is shown a covering layer for the drums and supporting-rollers, this covering layer $b^3$ consisting of any fibrous material, for the purpose of providing a surface to exert a frictional hold on the traveling platform.

I claim as my invention—

1. In a stall for horses or like animals comprising side parts and a movable floor-section, a floor or deck having an opening therein, said opening adapted to receive and be substantially filled by the movable floor-section, said movable floor-section being supported from below the main floor or deck and in a substantially horizontal position, and means for raising one end of the movable floor whereby it is caused to move when a weight, as that of an animal, is applied thereto.

2. In combination with a floor, deck or horizontal base, a movable floor adapted to be supported thereby, an opening through the support, floor or deck substantially equal in width to the width of the movable floor, and means for raising said movable floor through the opening at one end above the plane of the main deck, floor or support.

3. In combination with a horizontal support, floor or deck, a framework pivotally supported at one end and bearing rolls, a movable floor supported upon and adapted to be carried by said rolls, an opening through the support or deck of a width substantially equal to the width of the movable floor, and means for raising and lowering one end of the frame whereby the movable section of the floor may be raised to various angular positions with relation to the main floor or support.

4. In combination with a horizontal support, deck or floor, a framework supported below said floor or support and provided at one end with means for changing the angular position of the framework with respect to the support, rolls arranged at opposite ends of the framework, means for adjusting one of said rolls longitudinally thereof, an opening through the main floor or support, and a movable floor borne upon the rolls and adapted to fill said opening.

5. In combination with a horizontal support, deck or floor, a framework supported below said floor or support and provided at one end with means for changing the angular position of the framework with respect to the support, rolls arranged at opposite ends of the framework and rolls intermediate said rolls and adapted to support a movable floor, means for adjusting one of said rolls longitudinally thereof, an opening through the main floor or support, and a movable floor borne upon the rolls and adapted to fill said opening.

NEILSON BURGESS.

Witnesses:
 JOSEPH O. LUNT,
 THOS. W. QUIN.